United States Patent [19]

Conville

[11] Patent Number: 4,995,605
[45] Date of Patent: Feb. 26, 1991

[54] PANEL FASTENER CLIP AND METHOD OF PANEL ASSEMBLY

[75] Inventor: David J. Conville, Hot Springs, Ark.

[73] Assignee: Conlab Inc., Hot Spring, Ark.

[21] Appl. No.: 206,085

[22] Filed: Jun. 10, 1988

Related U.S. Application Data

[63] Continuation-in-part of Ser. No. 67,369, Jun. 29, 1987, Pat. No. 4,782,642.

[51] Int. Cl.$^5$ .............................................. E04B 1/40
[52] U.S. Cl. ..................................... 52/770; 52/489; 52/514; 52/584; 52/714
[58] Field of Search ................. 52/514, 489, 584, 703, 52/714, 98, 715, 770

[56] References Cited

U.S. PATENT DOCUMENTS

| | | | |
|---|---|---|---|
| 3,289,374 | 12/1966 | Metz | 52/514 |
| 3,308,590 | 3/1967 | Ettore et al. | 52/483 X |
| 3,529,918 | 9/1970 | Jureit | 52/483 X |
| 3,577,694 | 5/1971 | Omholt | 52/489 |
| 3,881,293 | 5/1975 | Conville | 52/489 X |
| 4,127,975 | 12/1978 | Judkins | 52/489 |
| 4,333,286 | 6/1982 | Weinar | 52/489 X |
| 4,448,007 | 5/1984 | Adams | 52/489 |
| 4,498,272 | 2/1985 | Adams | 52/483 X |
| 4,621,473 | 11/1986 | Wendt | 52/489 |
| 4,782,642 | 11/1988 | Conville | 52/770 |

FOREIGN PATENT DOCUMENTS

610386 4/1979 Switzerland ..................... 52/714

*Primary Examiner*—Richard E. Chilcot, Jr.

[57] ABSTRACT

Construction methods and clip apparatus for joining or repairing wall or ceiling panels such as sheet rock, gypsum boards, plywood, or other generally planar wall panels. The clip is enables permanent edgewise joining of wallboard panels, ceiling panels, or the like at any desired position along the length of the wall frame or ceiling framework independent of framing back- up studs or joists. A plurality of metallic clips unite to provide an edgewise mechanical bond between adjacent panel edges by creating an artificial backing in wall regions having no studs or support columns. A preferred clip comprises a generally planar, elongated body having a pair of parallel reinforcement grooves, and body is preferably stamped from metal stock and selectively perforated. A pair of integral, spaced apart, prong-like spring tab structures formed on opposite sides of the clip body initially grasp the edges of a panel. Each spring tab includes an integral, upwardly extending vertical portion disposed substantially perpendicularly to the body and an integral, arcuate, substantially horizontal flange portion. The flange portion is separated from its vertical companion by a weakened, scored tear edge which permits manual removal of the flange by appropriate bending after clip installation. The spring tabs project toward the clip front to maximize the working area of the clip body available for fastening to the second or later panels. A pair of opposing riser wings extend upwardly from either side of the front body portion. When installed, the wallboard paneel is contacted by the riser wings and retained at an angular disposition relative to the next adjacent panel, to insure a smooth, gap-free seam.

25 Claims, 5 Drawing Sheets

PANEL FASTENER CLIP AND METHOD OF PANEL ASSEMBLY

CROSS REFERENCE TO RELATED APPLICATION

This is a continuation-in-part of the co-pending application Ser. No. 067,369, filed on June 29, 1987 entitled METHOD AND APPARATUS FOR PANEL EDGE COUPLING, now U.S. Pat. No. 4,782,642.

BACKGROUND OF THE INVENTION

The present invention relates generally to apparatus and method for joining wall or ceiling panels such as gypsum wallboard or drywall. More particularly, the present invention relates to an improved fastener clip and a method for applying the clip for permanently joining the edges of wallboard panels, ceiling panels, or the like at any desired position along the length of the wall frame or ceiling framework independent of framing back-up studs or joists.

As will be appreciated by those skilled in the art of wall construction, conventional "drywall" gypsum wall boards of four-foot width are customarily nailed, screwed, or stapled to a substructure of vertical framing studs typically constructed of wooden two-by-fours spaced apart at sixteen or twenty-four inch intervals. Using conventional methods of wall construction a builder will typically align one edge of the wallboard with the central axis of a framing stud. In the application of gypsum panels in the vertical plane walls it is customary to measure the distance from one end of the panel to the middle of the stationary backing nearest the other end of the panel. The panel is then cut back to the middle of the stud. Thus the next panel can be attached to the same stud and the procedure repeats itself. When the board is thus correctly positioned, it will be permanently fastened to the stud upon any one of a wide variety of conventional fasteners, such as clamps, nails, screws, clips, or the like. The wallboard will typically be extended over to meet the central axis of the next proximate vertical framing stud, where the center of the board will be similarly permanently fastened. Thus wallboard widths of eight, ten, twelve, fourteen etc. feet will extend between many of the vertical studs spaced at twenty-four inches or sixteen inches.

The fastening of conventional wall panels would entail no particular difficulty or waste where the framing stud spacing "matches" standard factory gypsum dimensions. However, it is almost always necessary to space the framing studs closer together on irregular or shortened walls, on cathedral ceilings, at corners, and about doors. In such instances, the wallboard panel is fastened at one edge to the center of a vertical stud and extended across the frame to the next proximate studs. Any length of panel which extends beyond the center of the last proximate stud will then be cut away from the board and simply discarded. As a result, more time is required, and a substantial amount of wallboard material is also wasted, which results in higher costs. Moreover, the discarded scrap material is virtually never profitably reclaimed.

Typically, adjacent panels are placed in edge-to-edge abutment and carefully aligned to create the appearance of a smooth, uniform wall surface. Small intermediate gaps or air spaces often remain in the seams between the edges of adjacent panels as a result of rough, uneven cutting or improper alignment of panels. Even when the seams are filled, floated, and taped, some visually detectable irregularity in the resulting wall surface almost inevitably results. Such irregularities are particularly noticeable along long expansions of wall surface such as in corridors, conference centers or other large rooms, or on vaulted ceilings. Correction of the defect normally requires a great deal more additional effort time, and expense than is economically justifiable.

The repair of damaged wallboards or the opening and removal of an inspection plate requires that a complete section of the wallboard be removed. It is very difficult for replacement sections or strips to be thereafter properly fastened in place when no stud or ceiling joist is readily proximate for anchoring or backup.

Prior art panel fastener devices known to me fail to address the desirability of joining wallboard panels together along the expanse of the frame where no vertical framing studs are disposed. Representative of the broad prior art panel fasteners which are adapted to be fastened to vertical studs are U.S. Pat. No. 4,127,975, issued to Judkins on Dec. 5, 1978; and U.S. Pat. No. 4,333,286, issued to Weinar on June 8, 1982. The earlier fastener system described in Judkins, 4,127,975, comprises a rigid clip adapted to anchor the edges of prefinished wall board panels to steel or framing studs. The Judkins clip includes a pair of sharpened points which are adapted to penetrate the hard interior gypsum of the wallboard.

However, the '975 fastener cannot be used to join panel edges independent of a supporting stud or joist. Moreover a special application tool is normally required to provide sufficient driving force to penetrate the gypsum board.

U.S. Pat. No. 4,448,007, issued to Adams on May 15, 1984 discloses a panel fastener comprising an elongated body portion having a pair of rigid prongs or tabs adapted to forcibly penetrate and anchor into the wallboard panel. Swiss patent CH-610-386, issued Dec. 4, 1979 to Sabes discloses a panel clip adapted for use in conjunction with the assembly of tongue-and-groove panels. The clip includes angular teeth adapted to engage the panel board to prevent slippage.

Swenson, U.S. Pat. No. 2,799,058, issued July 16, 1957, teaches a method of fastening tongue-and-groove panels which facilitates construction of the panels in either edge-to-edge abutment or in overlapping relationship. The fastener disclosed therein includes a flattened body portion having pairs of interconnecting flanges. A screw-receptive mounting orifice is provided for anchoring the fastener into a supporting back-up wall surface. A similar panel construction system is disclosed by Hawes, U.S. Pat. No. 4,958,388. The Hawes system includes a multiplicity of fastener clamps designed to create a dovetail mortise.

One prior art method and apparatus for joining panel edges is described by Bains, U.S. Pat. No. 4,363,201, issued Dec. 14, 1982. Bains provides a pair of channel members which are permanently fastened to a vertical stud upon insulative spacer members. The reference fails to provide means or apparatus for joining panels independent of vertical studs or similar framing members. Other similar prior art systems of somewhat lesser relevance are disclosed in U.S. Pat. Nos. 3,308,590; 3,038,276; 3,529,918; and, 4,366,660. Finally a variety of other wallboard fasteners or clips exist in the prior art which are used for securing wallboards to framing members at corners. Among such prior art devices known to me are the clip of Conville U.S. Pat. No. 3,881,293, issued May 6, 1975; of Adams, U.S. Pat. No. 4,498,272 issued Feb. 12, 1985; U.S. Pat. 3,688,459, issued to Mattix on Sept. 5, 1972; and Anderson, U.S. Pat. No. 2,317,428, issued Apr. 27, 1943.

The device disclosed by Metz, U.S. Pat. No. 3,289,374, is adapted for use in the repair of plaster walls The device comprises a box adapted to be fastened to the back of the damaged wall to support a plaster patch. The device is securely fastened in place by a multiplicity of integral angular brackets.

None of the prior art systems known to me provides means for properly fastening wallboard or ceiling panels independently of supportive framing members. Moreover, none of the prior art systems of which I am aware provide or suggest means for conveniently temporarily fastening panels in position to permit the worker freedom of movement to assure proper alignment before fastening. Neither do the prior art devices known to me disclose or suggest means for effectively securing a patch or a section of panel to an existing panel member independently of framing members. A further disadvantage of the known prior art panel fastening techniques is that none provides means to completely close the intermediate air spaces or gaps between adjacent panel edges to create a desirable smooth, even wall surface.

Certain prior art dry wall repair kits do exist however, and two known kits are sold under the trademarks PRO PATCH and THE WALL DOCTOR. Both kits require the cutting of an appropriately dimensioned orifice in the damaged wallboard prior to fitting of a repair piece. And, in both instances, the repair piece is cemented or "glued and taped" in place without the use of any appropriate anchoring clips or fasteners. Without appropriate edgewise peripheral bracing, the repair panels or inserts fail to rigidly unite with the repaired wall board and noticeable misalignment may be occur.

SUMMARY OF THE INVENTION

The present invention comprises improved apparatus and techniques for coupling or joining two or more sheets or panels of materials such as gypsum wall board or plywood paneling together at their edges when they meet between studs or joists.

The present invention facilitates closely abutting, edgewise unions without requiring stationary rearward support from the studs or columns which normally back up wall boards. Further, the present invention provides an improved repair system for fixing or patching relatively small broken sections of wall board and the like.

The instant fastener clips effectively provide an artificial backing in wall regions having no studs or support columns. The preferred clip comprises a generally planar, elongated body formed with a pair of parallel reinforcement grooves. The clip body is preferably stamped from metal stock, and the ends and edges of the clip are rounded or radiused to soften and enhance handling. Substantial portions of the clip body disposed between the reinforcement grooves are perforated, so to facilitate the eventual reception of self tapping screws.

A pair of integral, spaced apart, prong-like spring tab structures are formed on opposite sides of the clip body and are adapted to grasp the edges of a panel during installation. Each spring tab includes an integral, upwardly extending vertical portion disposed substantially perpendicularly to the body and an integral, outwardly curved substantially horizontal flange portion. In the best mode the horizontal flange portion is separated from its vertical companion by a weakened scored tear edge which readily permits manual removal of the flange by appropriate bending after clip installation. In the preferred clip the spring tabs project towards the clip front to maximize the working area of the body thereafter available for fastening to the second or later panels.

Preferably, opposite edges of the clip front each include a slightly offset riser wing which projects angularly upwardly toward the spring tabs. The wings are adapted to raise and retain the wallboard panel in angular disposition relative to the clip front body portion, and thus force the outer edge of the panel into tight-fitting abutment with the outer edge of the opposing panel to which it is joined. The wings facilitate elimination of undesired gaps and airspaces between panel edges. Thus, when clips are installed to join panels, adjacent panel edges will form an angle slightly less than 180 degrees (i.e. they will not be totally co-planar). The resultant angled wallboard intersection results in a valley which produces a smooth, even wall surface after joint finish treatment. Consequently, wall finish problems such as "ribbing" and "crowning" are eliminated, and the effort and expense required for finishing the wall surface are substantially reduced.

A clip may be grasped by the hand and pressed or pushed onto the wallboard edge. The spring tab structure will resiliently couple the clip to the board edge, with the wallboard sandwiched between the spring clip flange portions and the clip front body. The vertical portions of the spring tabs will abut the board edge when the clip is pushed far enough onto the board. Spring-like bias from the spring tabs will at least semi-permanently maintain the clip(s) upon the board. A self-tapping screw should be forcibly installed through the wallboard into penetrating engagement with each clip along that edge to permanently affix each clip to the panel. The clip body is perforated for this purpose. Fasteners can be applied anytime after the clips are pressed to a board, whether or not the next adjoining board has been maneuvered into position.

The edge of the next wallboard will abut the spring tab on the opposite side of the tab horizontal flanges. This adjacent board will smoothly overly the rear portion of the clip. After the next board is installed adjacent the previously "clipped" board, additional screws correctly targeted and driven through the second wallboard will engage the rear end of the perforated clip and the panels will thus be coupled together. Targeting of fasteners is expedited by visually aligning the appropriate screw relative to regions broadly defined and located by the clip flanges. The clip horizontal flange portions may then be manually bent and torn off. Because of the riser portions of the clips, the edges of coupled wallboard pieces will be slightly "bowed" into tight-fitting abutment with the edge of the adjacent panel. In effect, this creates a sort of "mechanical taper" or valley to absorb joint treatment material, such as mud, and undesirable intermediate gaps or spaces are virtually eliminated.

The clips of the present invention may also be employed to make aesthetically pleasing repairs or alterations to wall boards. In use, the clips establish an artificial backing which provides rearward support for either the original or a replacement wall board piece.

Thus a fundamental object of the present invention is to provide methods and apparatus for permanently joining wallboard panels of a wall independent of a framing stud or other wall-supporting substructure, and to firmly secure them together.

A similar fundamental object of the present invention is to provide a flexible fastener apparatus for fastening together wallboard panels in the manner described.

Another basic object of the present invention is to provide a method for joining irregular panels or pieces of wallboard independent of a stationary back-up framework.

A similar object of the present invention is to provide a method and a fastener apparatus to facilitate quick and convenient patch or repair of a wallboard panel.

Yet another object of the present invention is to provide a wallboard fastener which is adapted to force adjacent wallboard panels into tight-fitting abutment to virtually eliminate intermediate gaps and visible surface seams.

Another object is to reduce wall finish problems such as "ribbing" and "crowning," and to reduce the effort and expense required for finishing wall surfaces.

A still further object of the present invention is to provide a method and a fastener apparatus of the nature described for temporarily fastening wallboard or ceiling panels in position between ceiling joists.

Still another object of the present invention is to provide a method for fastening wallboard, ceiling, or other panels which can be quickly and conveniently accomplished without the use of specialized applicator tools.

Another important object of the present invention is to readily permit or enable an installer to attach or lock sheets or panels in place between stationary members when working with sloped planes such as those encountered with cathedral or vaulted ceilings.

A further object of this invention is to allow irregular panels or pieces of material such as gypsum board which may have been intentionally cut out and temporarily removed to be rejoined with the wall whether or not a supportive stud or column is readily available or convenient. It is a feature of the present invention that the disclosed fastener device may be attached to the existing gypsum and cut-out piece simply re-inserted into the wall without creating surface irregularities due to misalignment of panel portions.

A still further object of the present invention is to provide an improved fastening clip of the character described which is adapted to concurrently fasten three abutting panels together. It is a feature of the present invention that a clip may also be used to create a three-way junction.

A still further object of the present invention is to provide a clip structure of the character described which can be combined with an after-market repair kit for quickly finishing broken dry wall, gypsum wall board, Sheet Rock-brand dry wall board or the like by the "do-it-yourself" market.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
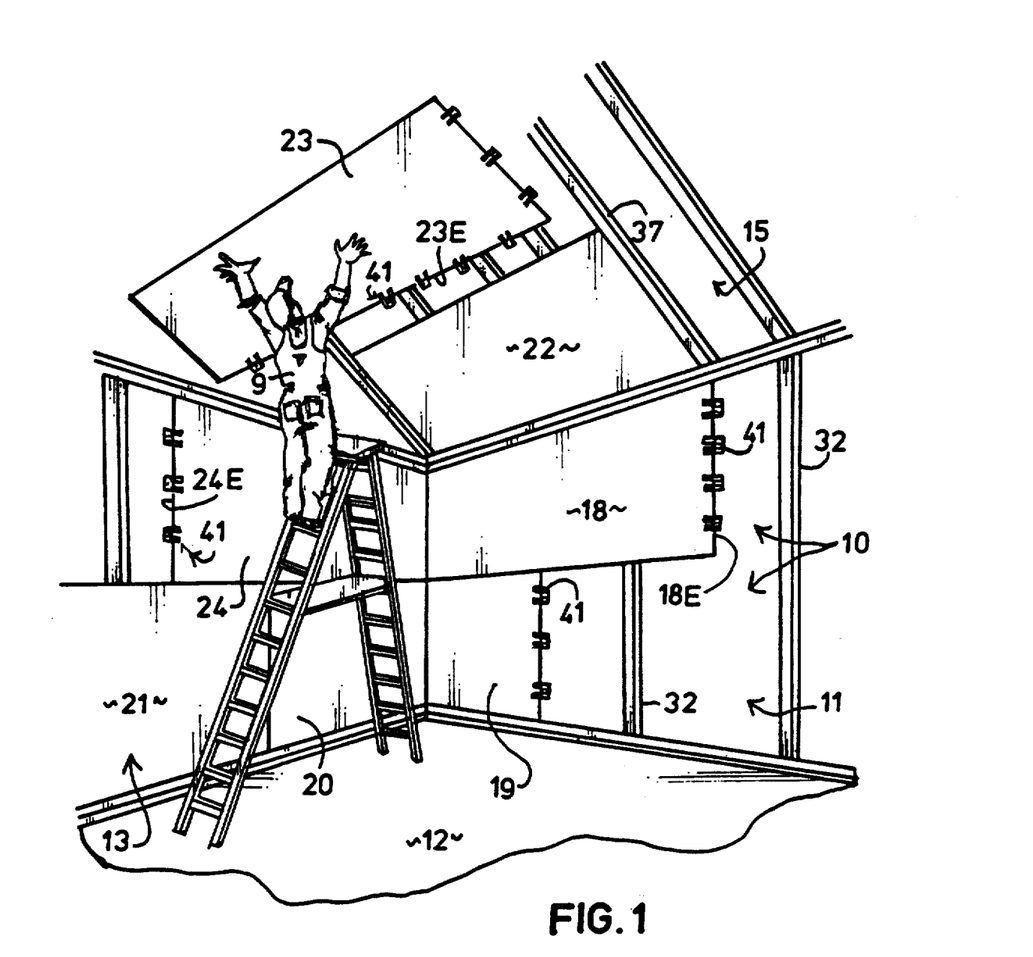
FIG. 1 is a fragmentary pictorial view of a construction scene illustrating various wall boards and the placement of a ceiling panel in accordance with the teachings of the best mode of my invention.
Figure 2:
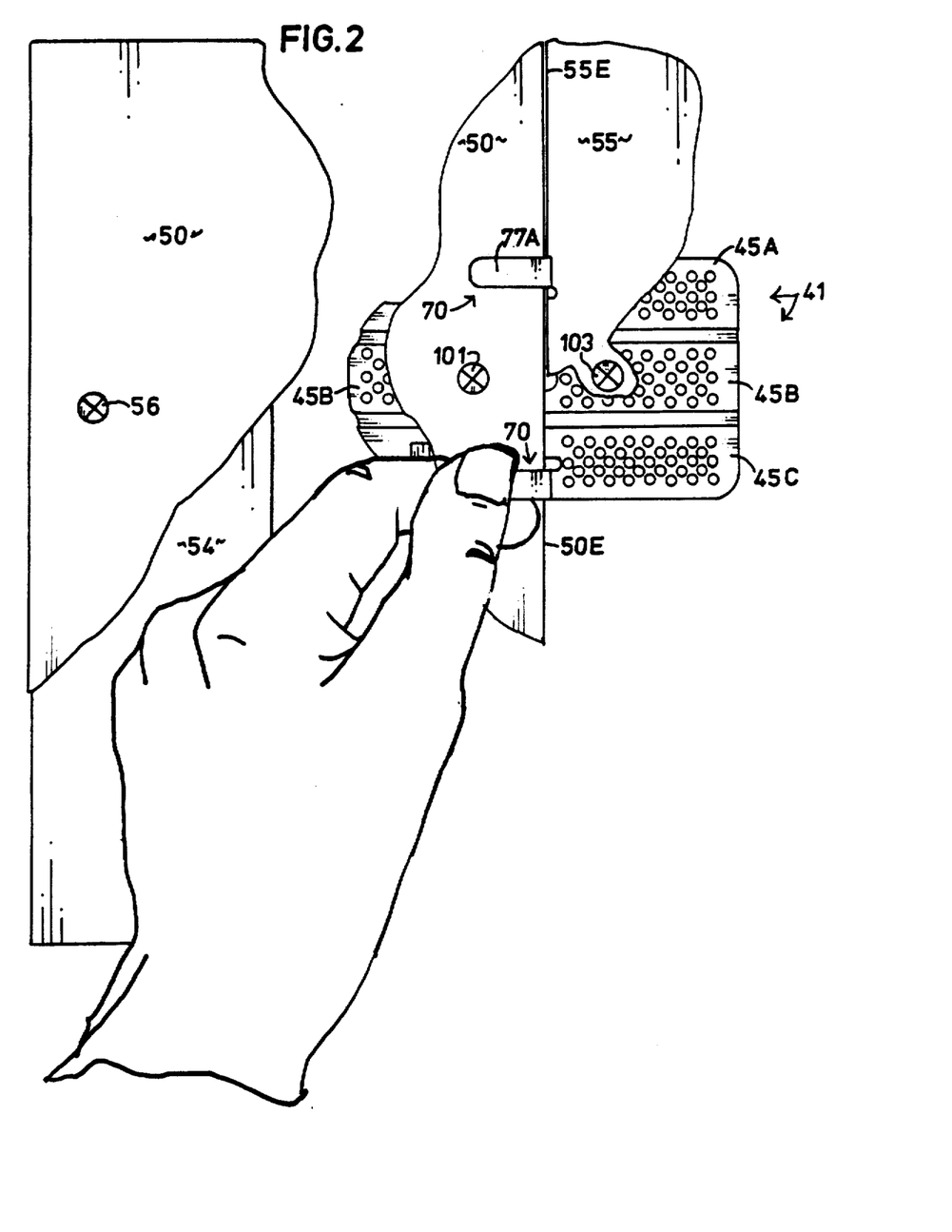
FIG. 2 is an enlarged, fragmentary pictorial view illustrating my improved fastener clip disposed in operative position joining two wall panels in edgewise abutment.

With initial reference now directed to FIGS. 1 and 2 of the appended drawings, a typical wall construction zone has been generally designated by the reference numeral 10. As will be appreciated by those skilled in the art, the walls generally indicated by the reference numerals 11 and 13 rise upwardly from the floor 12 forming a junction with the roof structure 15. Both walls 11 and 13 are constructed from a plurality of abutting and properly fitted wallboards such as gypsum wall board panels 18-24. Panels 23 and 22 are to be installed upon the roof structure. A typical wall board panel will normally be nailed or otherwise fastened to one or more of a plurality of spaced apart wall studs 32 or rafters 37.

Hitherto wallboards had to be trimmed to size, so that the portion of board 18 overlying column 32 would normally be cut away and discarded (FIG. 1). The dimensions of the discarded portion would be somewhat related to the stud spacing, which is generally sixteen or twenty four inches. It will be noted that board 18 has not been trimmed. Its edge 18E terminates in a region without a column or a stud, and it has been provided with a plurality of fasteners such as clips 41 coupled to its edge 18E. It will be noted that the workman 9 installing ceiling board 23 has similarly installed a plurality of fastener clips along panel edge 23E so that he may more easily join board 23 to board 22. A plurality of suitable clips 41, which will hereinafter be described in more detail, are used in conjunction with all modes and methods of the present invention.

A clip 41 may be fastened to the edge 50E of a wall board or gypsum board 50. The vertically oriented support column 54 may usually anchor wall boards with typical fasteners 56, and thus it is the conventional technique to merely cut the edge of board 50 and discard the remaining "odd" piece. Instead, FIG. 2 will reveal that an adjacent wall board 55 may be securely fastened at its edge by use of a plurality of clips 41 independently of any column to provide secure edgewise bracing.

With additional reference directed now to FIGS. 3 through 10, a preferred clip 41 comprises a generally planar, substantially rectangular elongated body 60 having a length 61 and a width 62. The front 64 of the body is spaced apart from the rear 65 thereof, and preferably a pair of parallel reinforcement grooves 68 and 69 run the length of the body 60 to provide inherent resistance to bending moments. The clip body thus comprises three general surface portions 45A, 45B, and 45C (FIGS. 4 and 12C), generally divided by the parallel, reinforcing grooves 68 and 69. As best viewed in FIG. 3, the body of the clip is substantially perforated. The multiplicity of orifices defining the perforations are adapted to readily receive self-tapping screws during the installation process. The body ends are rounded or radiused to soften and enhance handling. A tool indexing hole 43 (FIG. 3) is necessary to insure proper clip alignment during successive stamping and punching operations during clip manufacture.

Figure 3:
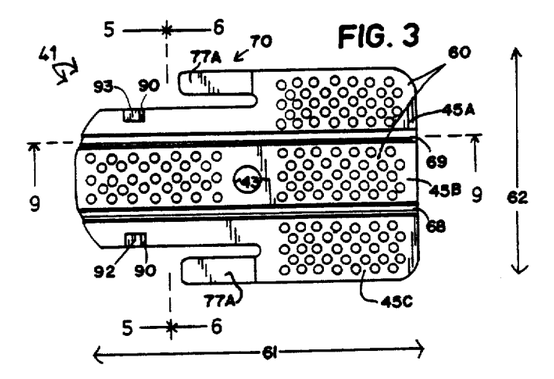
FIG. 3 is a top plan view of the preferred fastener clip.
Figures 4, 5:
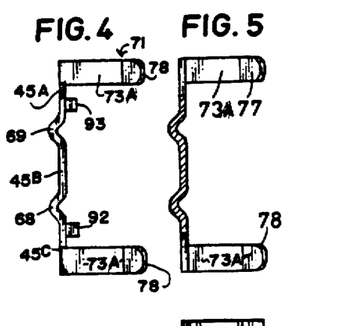
FIG. 4 is a front plan view thereof, taken from a position generally to the left of FIG. 3.
FIG. 5 is a sectional view taken generally along line 5—5 of FIG. 3.
Figure 6:
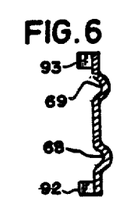
FIG. 6 is a sectional view taken generally along line 6—6 of FIG. 3.
Figure 7:
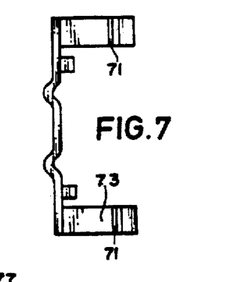
FIG. 7 is a rear plan view thereof taken from a position generally to the right of FIG. 3.
Figures 8, 9:
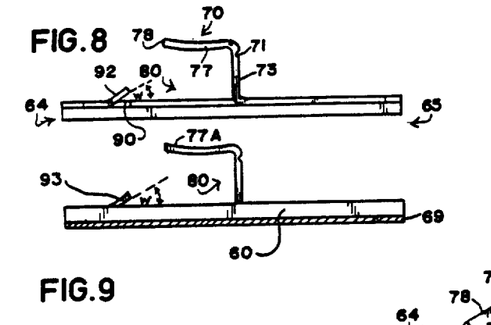
FIG. 8 is a right side elevational view, the left side being a thereof.
FIG. 9 is a longitudinal sectional view taken generally along line 9—9 of FIG. 3.
Figure 10:
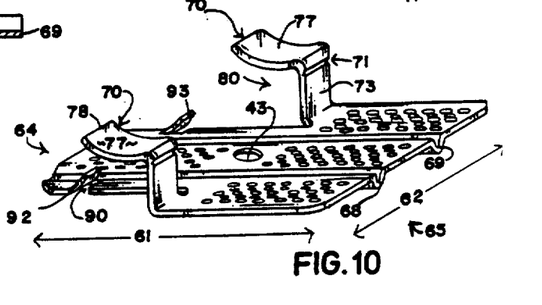
FIG. 10 is a right side isometric view thereof.
Figure 11:
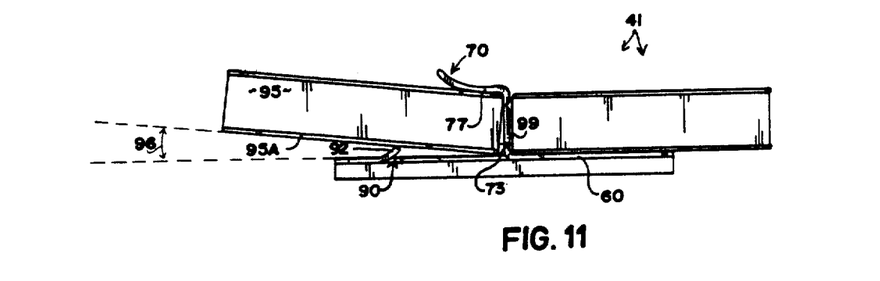
FIG. 11 is a right side elevational view illustrating the clip properly installed to fasten together a pair of abutting wallboard panels.

A pair of spaced apart, forwardly projecting spring tabs, generally designated by the reference numeral 70, are integrally formed on the spaced-apart opposite sides 63A, 63B (FIGS. 3, 8, 10) of the clip body 60. The spaced apart 63A, 63B (FIGS. 3, 8, 10). The prong-like spring tab assemblies are provided to grasp panel edges to initially fasten a clip to a panel. Each spring tab assembly 70 includes an integral, upwardly extending vertical portion 73 disposed substantially perpendicularly to the clip body 60, and an integral, substantially horizontally oriented flange portion 77. The arcuate flange portions 77 extend towards the front of the clip in generally parallel, spaced apart relation with respect to clip body 60 and terminate in leading edges 78. With reference to FIGS. 4, 5 and 11, vertical spring tab portions 73 include an inner face 73A which will contact and abut the edge of a board 95 upon which the clips are installed.

As best viewed in FIGS. 8–10, flange 77 is generally arcuate, presenting a concave top surface portion 77A. A cavity 80 is generally defined between the flanges 77 and the clip body 60 (FIGS. 8–10) to receive wallboard. Tabs are suitably distanced so that the spring tabs will resiliently, compressively engage a board or panel edge. The preferred construction prevents the spring tab from penetrating the wall board when clips are installed, and facilitates manual installation of the clips upon a wall or panel edge without the use of special tools.

In the best mode, the spring tab flange portions 77 are separated from the vertical portions 73 by a weakening, scored edge 71. This edge permits manual separation and removal of portions 77 after clip installation. Once the clips are installed to couple two boards together, the flanges 77 will be visible outside the joined panels, and they may be readily grasped for repeated bending until they break away from the clips. Any remaining exposed rough edges will be secured by the subsequent mud, joint compound or the like thereafter applied to the boundary region between the joined boards prior to finishing.

With specific reference now directed to FIGS. 8–11, a pair of riser wings 92, 93 are stamped into opposite front sides of the clip 41. The riser wings are disposed adjacent the generally L-shaped notches 90 formed during the stamping process. Riser wings 92, 93 extend angularly upwardly from the clip body at an angle W (FIGS. 8, 9) of roughly forty-five degrees, and extend generally in the direction of the spring tab assemblies. The wings 92, 93 contact the underside 95A of a wallboard 95 (FIG. 11) restrained between the spring tab assemblies and the front of the clip. Their purpose is to create a slight angle between mutually abutting wallboards along the line of intersection, as seen in FIG. 11. Thus an angle 96 between the wallboard 95 and the clip body 60 exists after installation because of board contact with the clip riser wings 92, 93.

As best viewed in FIG. 11, the wallboard panel appropriately fastened with the preferred clip is temporarily, firmly grasped by horizontal spring tab portion 77. Thus, the back or "inside" edge of the wallboard is disposed slightly angularly relative to body portion 60, and its outer edge firmly abuts the underside of spring tab flanges 77. In the best mode, the angle 96 is roughly ten degrees. The resulting seam 99 defined along adjacent edges of two abutting panels will include virtually no gaps.

In the preferred embodiment, the "widest" portion of the clip body is the rear portion 65 (FIG. 8). The front portion 64 is roughly two-thirds the width of the rear portion. Tabs 70 are aligned roughly with the center of the body adjacent the indexing orifice 43. Wings 92, 93 originate from a position located at roughly one-sixth the length of the clip from its front.

OPERATION

To install clip 41, the user may manually grasp the clip and forcibly couple it to a wall board edge, so that the wall board contacted by surface 73A and it is sandwiched between flange portion 77 and clip body 60. Spring-like bias from the spring tabs will at least semi-permanently maintain the clip in a suitable position. As best viewed in FIG. 2 a suitable fastener 101 (i.e. preferably a self-tapping screw) has been forcibly installed through the wall board within that zone broadly defined between adjacent spring tab flanges 70. When a fastener is driven through the wall board it will engage the front of perforated body portion 45B of the clip and permanently affix the clip to that wall board. Successive clips may be installed in like fashion upon the exposed edge of the first wallboard 50 (FIG. 2).

The next wallboard or panel 55 will be moved into position with its edge 55E adjoining edge 50E of the first board. Edge 55E will contact a plurality of previously mounted clips. Before installing fastener 103, the installer will "target" an area of the second wall board immediately proximate the board edge (i.e. to the right as viewed in FIG. 2), out between visibly exposed spring tab portions 70. Fastener 103 will thus be aimed properly into the rear of clip body portion 45B. Sprint tab flange portions 77 may then be manually grasped as in FIG. 2, and repeatedly bent until torn from the clip body. The remaining clip portion 33 will be hidden between the abutting panel edges. Panel 55 will thus be secured together such that its edge 55E is maintained in closely spaced apart relation relative to board edge 50E.

Thus clip 41 may be quickly used to install a pair of abutting panels together in an irregular positions with or without the use of vertical columns as rearward support. Boards may be installed in wall or roof sections either horizontally or vertically. Boards may be so installed without the usual cutting and waste of irregularly terminating spaced-apart ends. However, clip 41 also provides an additional feature which permits the worker 9 (FIG. 1) to move a panel 23 into a proper abutting position with a previously installed panel 22. In this case, if the plurality of clips 41 are previously established along lower edge 23E of a panel to be lifted, the clips will grip panel 23, so that the worker 9 does not need to temporarily brace panel 23 during installation.

Figure 12A:
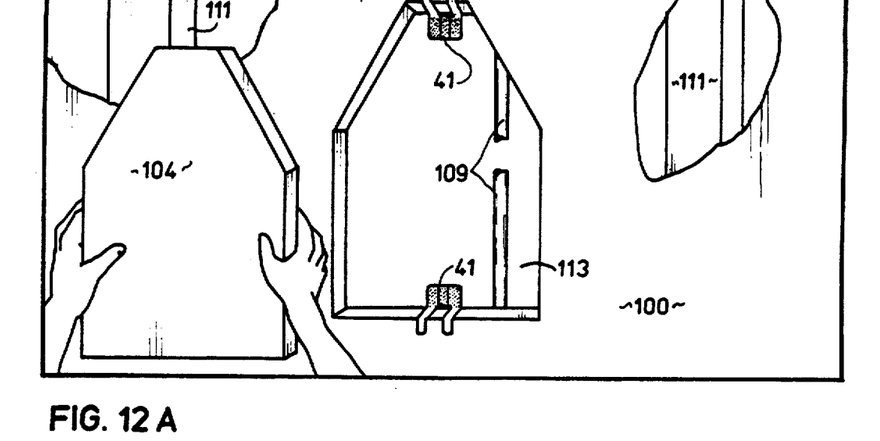
FIG. 12A is a fragmentary pictorial view illustrating use of clips of the present invention to effectuate a wall repair by appropriately mounting a suitable repair piece.

Use of the preferred clip 41 also facilitates convenient, aesthetically pleasing repairs to walls, as illustrated generally in FIG. 12A. For example, an interior wall 100 may block a pipe 109 which may require replacement or fixing by a plumber or the like. An inspection hole 113 is thus cut out of the wall, and when piece 104 is removed, repairs to pipe 109 may proceed. Afterwards wall piece 104 needs to be reinstalled over inspection orifice 113. However, in the absence of adjacent support columns 111, it has hitherto been extremely difficult to properly brace gypsum wall board replacement or repair pieces to create an even wall surface. With the installation of a plurality of clips 41, as shown in FIG. 12A, section 104 may be securely held in place within orifice 113, after being screwed into position upon suitable clips substantially as previously described. Subsequent application of tape, "mud", followed by sanding and painting will virtually completely cosmetically "fix" wall 100.

Figure 12B:
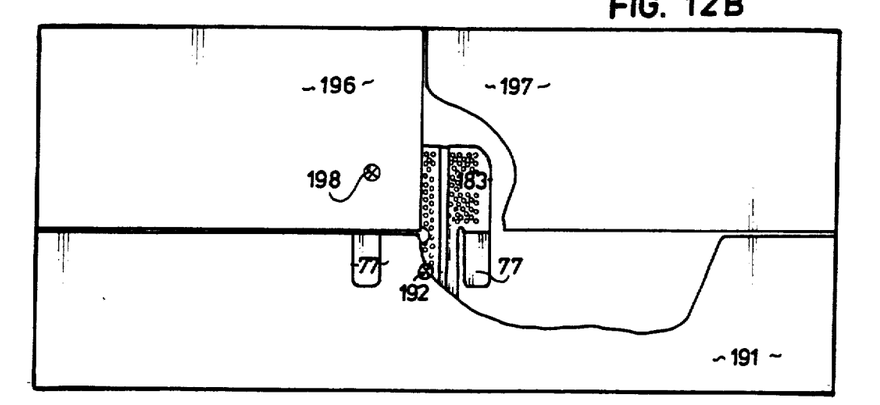
FIG. 12B is an enlarged, fragmentary pictorial view illustrating how the clip of FIGS. 8-11 can be used to join three intersecting panels in the corner regions of intersection.
Figure 12C:
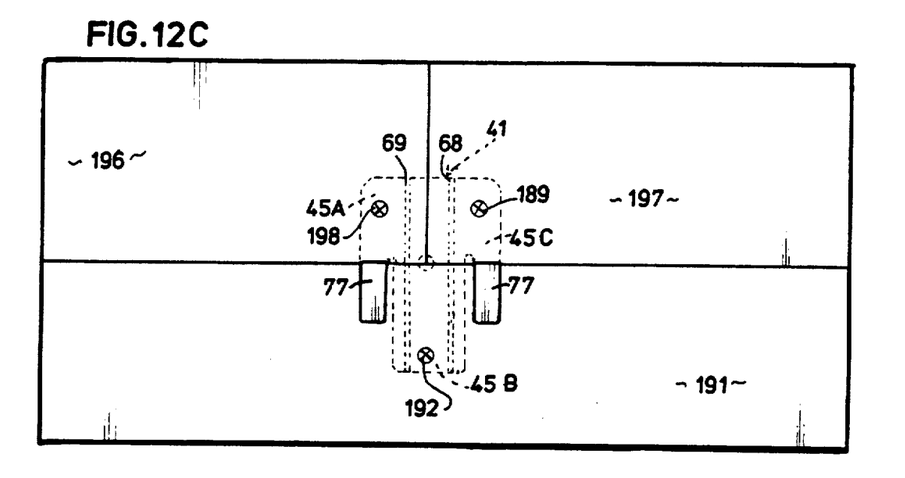
FIG. 12C is enlarged, fragmentary pictorial view similar to FIG. 12B, illustrating how various clip body regions are penetrated by fasteners when joining three intersecting panels in the corner regions of intersection, immediately prior to removal of the spring tab flanges.

FIGS. 12B and 12C illustrate use of a clip in a corner junction to unite three bordering sheets or panels. After clamping of the spring tab assemblies 77 over a first panel 191, the exposed rear clip area 183 is available to fasten second or third panels. A fastener 192 has been driven through panel 191 in between adjacent spring tab portions 77, which provide an aiming point for fastener installation. Panels 196, 197 may be joined to the exposed rear clip region 183. Region 183 may receive a fastener 198 to hold panel 196, and a similar fastener 189 (FIG. 12C) will similarly penetrate panel 197. As best illustrated in FIG. 12C, the front of clip body region 45B is penetrated by fastener 192. Rear clip body portions 45A and 45C are penetrated by fasteners 198 and 189 respectively, yielding a three-corner assembly.

Figure 13:
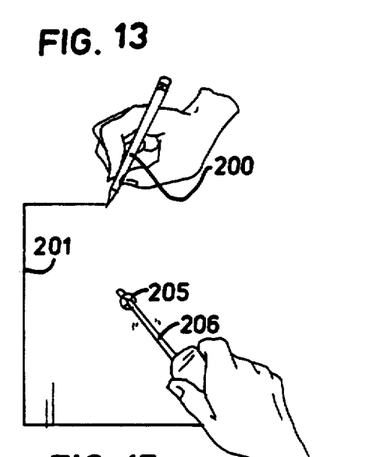
FIGS. 13 through 20 are fragmentary, diagrammatic and pictorial views successively illustrating step by step instructions for repairing a wall panel in conjunction with the "kit" form embodiment of the present invention.
Figure 14:
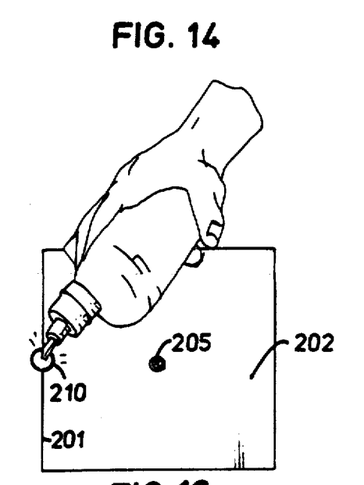
Figures 15, 16, 17, 18, 19, 20:
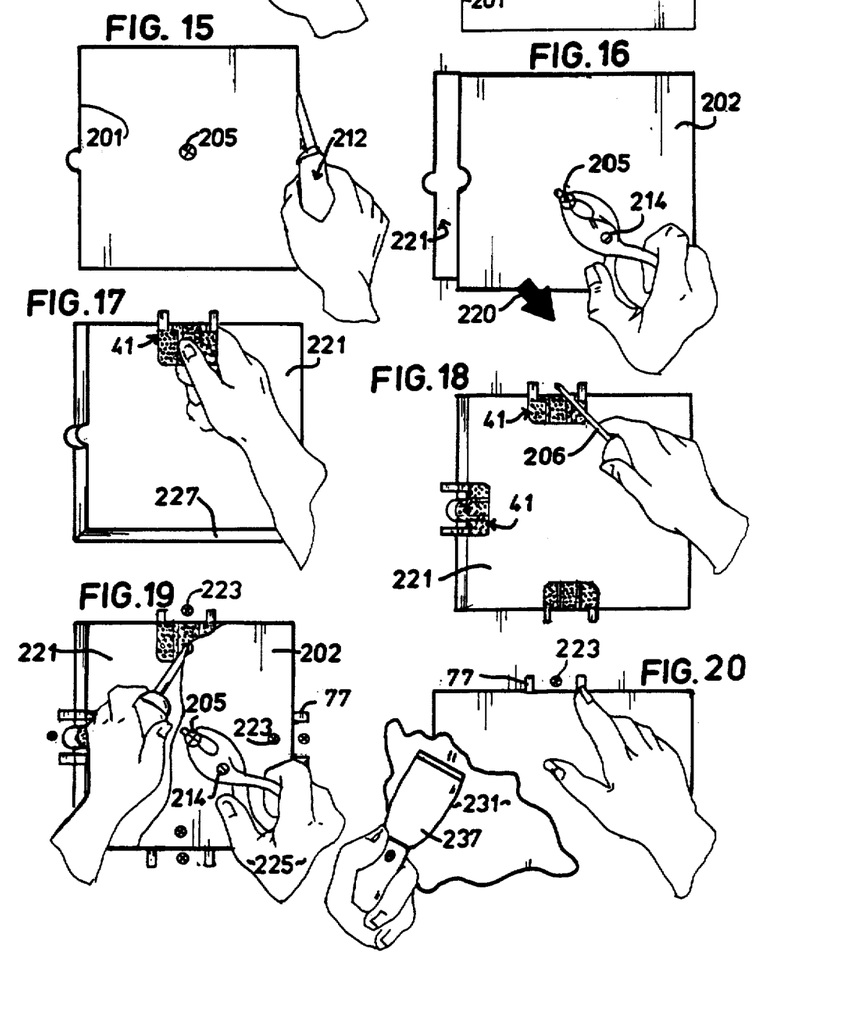

With reference now directed to FIGS. 13-20, clip 41 may be employed in conjunction with a repair kit for repairing or replacing a relatively small hole or damaged portion of a wallboard or the like. As seen in FIG. 13, it is contemplated that a conventional pencil 200 may be employed first to provide suitable markings 201 so that a panel 202 (FIG. 14) may be removed. Preferably a temporary fastener such as screw 205 is installed with a screw driver 206. It is desirable to drill a hole 210 somewhere on the border 201. A sabre saw may then be used to cut around the border 201 (FIG. 15). When sawing is completed pliers 214 which grasp fastener 205 may remove cut-out 202 by gentle pulling in the direction of arrow 220, exposing a hole 221.

Prior to fixing, a plurality of clips may be suitably fastened about the edge 227 of the orifice 221. Again a simple screw driver 206 may be employed as an FIG. 18. The cut-out 202 (FIG. 19) may thereafter be placed over the region 221 and it will "cover" the exposed rear body portions of clip 41. Fasteners 223 are installed as previously suggested. Fastener installation is facilitated by the perforated character of the clip bodies. Gentle movement of hand 225 with pliers 214 can move the cut out 202 into position for screwing. Afterwards, spring tab flange portions 77 are manually broken away as in FIG. 20, and the center holding screw 205 is removed. Appropriate conventional materials 231 may be manually applied thereafter with finishing tools 237 to facilitate subsequent sanding and wall painting.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A construction method for securely coupling together adjacent panels of gypsum board, sheet rock, masonite, insulation board, plywood or the like, which panels having abutting finished edges which, during wall assembly, terminate at random positions spaced apart from the wall studs, support columns or the like, said method comprising the steps of:

conventionally installing a first panel upon and between spaced apart studs or vertical support columns during assembly with an exposed edge of said first panel randomly positioned apart from the nearest stud or vertical support column over a hollow region of the wall structure;

applying at least one clip to the exposed, finished panel edge to prepare said first panel for coupling to a second panel finished edge, each of said clips comprising:

a generally rectangular and planar, perforated body portion adapted to be blindly penetrated by a self tapping screw, said body portion having a length greater than the thickness of said panel(s), a front, a rear, and a pair of spaced apart sides;

prong-like spring tab means integrally projecting forwardly from said clip body portion at said spaced-apart sides thereof, each of said spring tab means including a vertical portion generally perpendicular to said clip body portion and an integral offset horizontal flange portion oriented generally parallel with said clip body portion adapted to readily frictionally grasp a finished edge of a panel to sandwich same against said clip body; said spring tab flange portions spaced apart from said clip body portion a distance approximately equal to or less than the thickness of said panel;

installing a fastener through said first panel substantially within a region defined between said spring tab means horizontal portions so as to penetratingly engage said clip body in a substantially random position thus permanently affixing said at least one clip to said first panel;

positioning a second panel having an exposed finished edge immediately adjacent to the exposed, finished edge of said first panel over exposed planar portions of said at least one clip with said finished edges of said panels substantially abutting one another;

installing another fastener through said second panel immediately adjacent said spring tab means horizontal portions so as to permanently couple said second panel to said at least one clip body portion whereby said first and second panels are coupled together along their exposed finished edges and the panels are at least temporarily slightly angulated relative to one another by the clip with the clip forming the sole backup structure for the adjacent panels without additional mechanical linkage to a stud, support column or the like; and, thereafter manually removing said horizontal flange portions of said spring tab means by bending them until breakage occurs along a predefined scored junction, whereby to ultimately construct an unobstructed wall surface for subsequent finishing.

2. The method as defined in claim 1 wherein the flange portions of said spring tab means are outwardly curved to compressively grip the panel edge when said clip is manually installed and to avoid penetration of the finished panel edge, and to facilitate subsequent manual manipulation, breakage and removal of the spring tab flanges.

3. The method as defined in claim 1 wherein said clips comprise riser wings disposed upon opposite spaced apart sides of the clip body at the front of said body to create an angle between panels and the clip body.

4. The method as defined in claim 3 wherein said riser wings extend angularly upwardly from the clip body generally in the direction of the spring tab assemblies.

5. The construction method as defined in claim 4 wherein said clips include a pair of parallel, spaced apart reinforcing grooves extending longitudinally between said front and said rear of said clip body portion.

6. A method for securely repairing randomly located holes in panels of gypsum board, sheet rock, masonite, insulation board, plywood or the like without mechanical connection to or support from the internal, spaced apart wall studs, support columns or the like, said method comprising the steps of:

defining and locating a hole in said panel to be repaired;

applying a plurality of clips at spaced apart locations about the internal periphery of said hole to be repaired, each of said clips comprising:

a generally rectangular and planar, perforated body portion adapted to be blindly penetrated by a self tapping screw, said body portion having a length significantly greater than the thickness of said panel, a front, a rear, and a pair of spaced apart sides;

prong-like spring tab means integrally projecting forwardly from said clip body portion at said spaced apart sides thereof, each of said spring tab means including a vertical portion generally perpendicular to said clip body portion and an integral offset horizontal flange portion oriented generally parallel with said clip body portion adapted to readily frictionally grasp said panel to sandwich same against said clip body; said spring tab flange portions spaced apart from said clip body portion a distance approximately equal to or less than the thickness of said panel;

riser wings disposed at said body front upon said sides of the clip body to create an angle between panels and the clip body;

whereby a plurality of clips may be initially installed about the periphery of said hole to be repaired;

installing a self-tapping fastener through said wall substantially within regions defined between said spring tab means horizontal portions so as to penetratingly engage each clip body portion to permanently affix them;

positioning an appropriately shaped repair piece within said hole over said clips;

installing a self-tapping fastener through regions of said repair piece immediately adjacent said spring tab means horizontal portions so as to permanently couple said repair piece to said clips whereby said repair piece is permanently secured to the wall within said hole without additional mechanical linkage to a stud, support column or the like; and, thereafter manually removing said horizontal flange portions of said spring tab means by manually bending them until breakage occurs along a predefined scored junction, whereby to ultimately construct an unobstructed wall surface for subsequent finishing.

7. The method as defined in claim 6 wherein the flange portions of said spring tab means are outwardly flared to compressively grip the edges of a hole to be fixed when clips are installed and to facilitate manual manipulation thereof.

8. The method as defined in claim 6 wherein said riser wings extend angularly upwardly from the clip body generally in the direction of the spring tab assemblies.

9. The method as defined in claim 6 wherein said clips include at least one longitudinal extending reinforcing groove defined in said clip body portion.

10. The method as defined in claim 6 wherein:

the flange portions of said spring tab means are outwardly flared to compressively grip the edges of a hole to be fixed when clips are installed and to facilitate manual manipulation thereof;

said riser wings extend angularly upwardly from the clip body generally in the direction of the spring tab assemblies; and, said clips include at least one longitudinally extending reinforcing groove defined in said clip body portion and extending between said front and said rear.

11. A clip for enabling the coupling together of adjacent panels of gypsum board, sheet rock, masonite, insulation board, plywood or the like which have abutting finished edges which, during construction of a wall, end up randomly positioned relative to spaced apart wallstuds, support columns or the like, said clip comprising:

a generally planar body portion comprised of perforated metal, said body portion having a length significantly greater than the thickness of said panel, a front, a rear, a pair of spaced apart sides, and at least one reinforcing groove extending generally longitudinally between said front and said rear;

prong-like spring tab means integrally projecting forwardly from said clip body portion at said sides thereof for compressively clamping said clip about an exposed edge of said panel, each of said spring tab means comprising:
a vertical portion generally perpendicular to said clip body portion;
an integral, arcuate, offset horizontal flange portion oriented generally parallel with said clip body adapted to readily grasp an edge of a panel and to sandwich same against said clip body without penetrating the panel; and,
said spring tab flange portions spaced apart from said clip body portion a distance approximately equal to or less than the thickness of said panel;
said spring tab flanges generally defining a region about said panel for installing a self-tapping fastener through said panel substantially within said region whereby to penetratingly engage said clip body portion to permanently affix said clip to said first panel;
said clip body having an exposed rear portion immediately adjacent to the exposed edge of said first panel over which at least a portion of a second panel may be laid and into which another fastener may be installed to permanently couple two or more panels together; and,
said clips comprising riser wings disposed upon said sides of the clip body to at least temporarily create angle between adjacent coupled panels.

12. The clip as defined in claim 11 wherein said riser wings extend angularly upwardly from the clip body generally in the direction of the spring tab assemblies.

13. The clip as defined in claim 11 wherein said horizontal flange portions of said spring tab means are separated from the vertical portions thereof by a scored junction which facilitates manual bending of said flanges until they break away from said body for removal.

14. The clip as defined in claim 13 wherein the flange portions of said spring tab means are outwardly flared to compressively grip and avoid penetration of the panel edge when said clip is installed and to facilitate manual manipulation and removal of the flanges.

15. The clip as defined in claim 14 wherein said riser wings extend angularly upwardly from the clip body generally in the direction of the spring tab assemblies.

16. A construction clip for enabling the coupling together of adjacent panels of gypsum board, sheet rock, masonite, insulation board, plywood or the like which have abutting finished edges which, during construction of a wall, end up randomly positioned relative to spaced apart wall studs, support columns or the like, said clip comprising:
generally rectangular and planar, perforated body means for embracing said panels, said body means comprising a length significantly greater than the thickness of said panel, a front, a rear, a pair of spaced apart sides, and at least one reinforcing groove defined in said body means and extending generally between said front and said rear;
prong-like spring tab means integrally projecting forwardly from said clip body portion at said sides thereof for compressively clamping said clip about an exposed edge of said panel, each of said spring tab means comprising:
a vertical portion generally perpendicular to said clip body portion;
an integral, arcuate, offset horizontal flange portion oriented generally parallel with said clip body adapted to readily grasp an edge of a panel and to sandwich same against said clip body without penetrating the panel;
said spring tab means flange portions spaced apart from said clip body portion a distance approximately equal to or less than the thickness of said panel; and
said horizontal flange portions of said spring tab means being separated from the vertical portions thereof by a scored junction which facilitates breaking away from said body means for removal;
said spring tab flanges generally defining a region about said panel for installing a self-tapping fastener through said panel substantially within said region whereby to penetratingly engage said clip body portion to permanently affix said clip to said first panel;
said body means having an exposed rear portion immediately adjacent to the exposed edge of said first panel over which at least a portion of a second panel may be laid and into which another fastener may be installed to permanently couple two or more panels together; and,
riser wing means associated with said sides of the clip body to at least temporarily create an angle between adjacent coupled panels, said riser wings extending angularly upwardly from said body means generally in the direction of the spring tab means.

17. The clip as defined in claim 16 wherein said spring tab means horizontal portions are outwardly flared to compressively grip and avoid penetration of the panel edge when said clip is installed and to facilitate manual manipulation and removal of the flanges.

18. A construction method for securely coupling together adjacent panels of gypsum board, sheet rock, masonite, insulation board, plywood or the like, which panels having abutting finished edges which, during wall assembly, terminate at random positions spaced apart from the wall studs, support columns or the like, said method comprising the steps of:
conventionally installing a first panel upon and between spaced apart studs or vertical support columns during assembly with an exposed edge of said first panel randomly positioned apart from the nearest stud or vertical support column over a hollow region of the wall structure;
applying at least one clip to the exposed, finished panel edge to prepare said first panel for coupling to a second panel finished edge, each of said clips comprising:
a generally planar and rectangular, perforated body portion adapted to be blindly penetrated by a self tapping screw, said body portion having a length greater than the thickness of said panel, a rear, a front having a width less than the width of the rear, and a pair of spaced apart sides;
prong-like spring tab means integrally projecting forwardly from said clip body portion toward said front at said sides of said body portion, each of said spring tab means including a vertical portion generally perpendicular to said clip body portion and an integral offset horizontal flange portion oriented generally parallel with said clip body portion adapted to readily frictionally grasp a finished edge of a panel to sandwich same against said clip body; said spring tab flange portions spaced apart from said clip body portion a distance approximately equal to or less than the thickness of said panel;

wherein the flange portions of said spring tab means are outwardly curved to compressively grip the panel edge when said clip is manually installed, to avoid penetration of the finished panel edge, and to facilitate subsequent manual manipulation, breakage and removal of the spring tab flanges;

a pair of spaced apart riser wings disposed upon sides of the clip body to create an angle between panels and the clip body during installation, said riser wings extend angularly upwardly from the clip body toward said spring tab assemblies; and, a pair of parallel, spaced apart longitudinally extending reinforcing grooves defined in said clip body portion to prevent deformation thereof during clip installation;

installing a fastener through said first panel substantially within a region defined between said spring tab means horizontal portions so as to penetratingly engage said clip body in a substantially random position thus permanently affixing said at least one clip to said first panel;

positioning a second panel having an exposed finished edge immediately adjacent to the exposed finished edge of said first panel over exposed planar portions of said at least one clip with said finished edges of said panels substantially abutting one another;

installing another fastener through said second panel immediately adjacent said spring tab means horizontal portions so as to permanently couple said second panel to said at least one clip body portion whereby said first and second panels are coupled together along their exposed finished edges and the panels are at least temporarily slightly angulated relative to one another by the clip with the clip forming the sole backup structure for the adjacent panels without additional mechanical linkage to a stud, support column or the like; and, thereafter manually removing said horizontal flange portions of said spring tab means by bending them until breakage occurs along a predefined scored junction, whereby to ultimately construct an unobstructed wall surface for subsequent finishing.

19. A method for securely repairing randomly located holes in panels of gypsum board, sheet rock, masonite, insulation board, plywood or the like without mechanical connection to or support from the internal, spaced apart wall studs, support columns or the like, said method comprising the steps of:

defining and locating a hole in said panel to be repaired;

applying a plurality of clips at spaced apart locations about the internal periphery of said hole to be repaired, each of said clips comprising:

a generally planar and rectangular, perforated body portion adapted to be blindly penetrated by a self tapping screw, said body portion having a length greater than the thickness of said panel, a rear, a front having a width less than the width of the rear, and a pair of spaced apart sides;

prong-like spring tab means integrally projecting forwardly from said clip body portion toward said front at said sides, each of said spring tab means including a vertical portion generally perpendicular to said clip body portion and an integral offset horizontal flange portion oriented generally parallel with said clip body portion adapted to readily frictionally grasp a finished edge of a panel to sandwich same against said clip body; said spring tab flange portions spaced apart from said clip body portion a distance approximately equal to or less than the thickness of said panel;

wherein the flange portions of said spring tab means are outwardly curved to compressively grip the panel edge when said clip is manually installed, to avoid penetration of the finished panel edge, and to facilitate subsequent manual manipulation, breakage and removal of the spring tab flanges;

a pair of spaced apart riser wings disposed upon opposite sides of the clip body at said front to create an angle between panels and the clip body during installation, said riser wings extend angularly upwardly from the clip body toward said spring tab assemblies; and, a pair of parallel, spaced apart reinforcing grooves defined longitudinally within said clip body portion to prevent deformation thereof during clip installation;

whereby a plurality of clips may be initially installed about the periphery of said hole to be repaired;

installing a self-tapping fastener through said wall substantially within regions defined between said spring tab means horizontal portions so as to penetratingly engage each clip body portion to permanently affixed them;

positioning an appropriately shaped repair piece within said hole over said clips;

installing a self-tapping fastener through regions of said repair piece immediately adjacent said spring tab means horizontal portions so as to permanently couple said repair piece to said clips whereby said repair piece is permanently secured to the wall within said hole without additional mechanical linkage to a stud, support column or the like; and, thereafter manually removing said horizontal flange portions of said spring tab means by manually bending them until breakage occurs along a predefined scored junction, whereby to ultimately construct an unobstructed wall surface for subsequent finishing.

20. A clip for enabling the coupling together of adjacent panels of gypsum board, sheet rock, masonite, insulation board, plywood or the like which have abutting finished edges which, during construction of a wall, end up randomly positioned relative to spaced part wall studs, support columns or the like, said clip comprising:

a generally planar body portion comprised of perforated metal, said body portion having a length significantly greater than the thickness of said panel, a rear, a front having a width less than said rear, a pair of spaced apart sides, and at least one reinforcing groove extending generally along its length;

prong-like spring tab means integrally projecting forwardly front said clip body portion at said sides thereof for compressively clamping said clip about an exposed edge of said panel, each of said spring tab means comprising:

a vertical portion generally perpendicular to said clip body portion;

an integral, arcuate, offset horizontal flange portion oriented generally parallel with said clip body adapted to readily grasp an edge of a panel and to sandwich same against said clip body without penetrating the panel, said horizontal flange portions being separated from the vertical portions thereof by a scored junction which facilitates manual bending of said flanges until they break away from said body for removal, wherein the horizontal flange portions are outwardly flared to compressively grip and avoid penetration of the panel edge when said clip is installed and to facilitate manual manipulation and removal of the flanges; and, said spring tab flange portions spaced apart from said clip body portion a distance approximately equal to or less than the thickness of said panel;

said spring tab flanges generally defining a region about said panel for installing a self-tapping fastener through said panel substantially within said region whereby to penetratingly engage said clip body portion to permanently affix said clip to said first panel;

said clip body having an exposed rear portion immediately adjacent to the exposed edge of said first panel over which at least a portion of a second panel maybe laid and into which another fastener may be installed to permanently couple two or more panels together; and, said clips comprising a pair of spaced apart riser wings disposed upon sides of the clip body to at least temporarily create an angle between adjacent coupled panels, said riser wings extending angularly upwardly from the clip body toward the spring tab assemblies.

21. A clip for enabling the coupling together of adjacent panels of gypsum board, sheet rock, masonite, insulation board, plywood or the like, said panels having abutting finished edges which during construction of a wall, end up, in effect, randomly positioned relative to spaced-apart wall studs, support columns or the like, said clip comprising:

a generally planar body portion comprising perforated metal, said body portion having a length significantly greater, in use, than the thickness of said panel and having a front, a rear, and a pair of opposite spaced-apart sides, prong-like spring tab members integrally-formed out of the material of said body portion and projecting forwardly from said body portion of said opposite sides thereof for use in compressively clamping the clip to an exposed edge of such a panel, each spring tab member comprising:

an upstanding portion generally perpendicular to the plane of said body portion;

an arcuate transverse portion, integral with the upstanding portion, offset from the plane of said body portion and generally parallel to the plane of said body portion, arranged to grasp readily an edge of said panel and to cause said edge to be sandwiched against said clip body portion without penetrating the panel; said spring tab transverse portions being spaced apart from said clip body portion by a distance, in use, approximately equal to or less than the thickness of said panel;

the spring tab transverse portions, in use, defining generally a region of said panel for installing a self-tapping fastener through the panel substantially within said region so as to penetrate and engage the clip body portion in order to affix said clip to a first such panel substantially permanently;

said clip body portion having an exposed portion immediately adjacent, in use, to the exposed edge of said first panel over which at least a portion of second such panel may be laid and into which another fastener may be installed to couple the two or more panels together substantially permanently;

whereby the direction in which said spring tab transverse portions extend from the upstanding portions is such that said spring tab transverse portions overlie an area from which material of said clip body portion has gone to form said spring tab members, and riser wings projecting out of said face of the clip body portion on opposite sides thereof to at least temporarily create an angle, in use, between the planes of panels held by said clip.

22. A clip as claimed in claim 21 wherein said generally planar body portion has at least one reinforcing groove extending generally along the length of said planar body portion.

23. A clip as claimed in claim 22 wherein said riser wings extend angularly upwardly from said clip body portion generally in the direction of the prong-like spring tab members.

24. A clip as claimed in claim 22 wherein said riser swings originate from a position approximately one-sixth the length of said clip from the front and are angled at approximately forty five degrees to the plane of said body portion.

25. A clip as claimed in claim 21, wherein said arcuate transverse portions are separated from said upstanding portions thereof by a scored junction which facilitates manual bending of the transverse portions until they break away from the upstanding portions.

* * * * *